US012691454B2

(12) United States Patent
Le Cras

(10) Patent No.: US 12,691,454 B2
(45) Date of Patent: Jul. 28, 2026

(54) SYSTEM AND METHODS FOR MOUNTING AND DEMOUNTING A LINER ELEMENT TO A MILL SHELL OF A MILL

(71) Applicant: METSO FINLAND OY, Espoo (FI)

(72) Inventor: Jared Le Cras, Thornlie (AU)

(73) Assignee: Metso Finland Oy, Espoo (FI)

( * ) Notice: Subject to any disclaimer, the term of this patent is extended or adjusted under 35 U.S.C. 154(b) by 216 days.

(21) Appl. No.: 18/558,676

(22) PCT Filed: Jun. 9, 2022

(86) PCT No.: PCT/EP2022/065699
§ 371 (c)(1),
(2) Date: Nov. 2, 2023

(87) PCT Pub. No.: WO2022/268517
PCT Pub. Date: Dec. 29, 2022

(65) Prior Publication Data

US 2024/0226909 A1 Jul. 11, 2024

(30) Foreign Application Priority Data

Jun. 23, 2021 (EP) .................................... 21181260

(51) Int. Cl.
*B02C 17/22* (2006.01)

(52) U.S. Cl.
CPC .................................... *B02C 17/22* (2013.01)

(58) Field of Classification Search
CPC ......... B02C 17/02; B02C 17/04; B02C 17/10; B02C 17/22; B02C 17/225
See application file for complete search history.

(56) References Cited

U.S. PATENT DOCUMENTS 6,082,646 A * 7/2000 Clarke .................... B02C 17/22 241/300
8,152,086 B2 * 4/2012 Moller .................. B02C 17/225 241/300

(Continued)

FOREIGN PATENT DOCUMENTS

CL 50847 7/2009
CL 64582 4/2020

(Continued)

OTHER PUBLICATIONS

Office Action and Search Report for Chilean Patent Application No. 202303262, mailed Jul. 23, 2025.

(Continued)

*Primary Examiner* — Matthew Katcoff
(74) *Attorney, Agent, or Firm* — Andrus Intellectual Property Law, LLP

(57) ABSTRACT

A system for mounting and/or demounting a liner element to a mill shell of a mill, wherein the system includes one or more liner lifting elements each structured and arranged to be fastened in a respective liner element through-hole such that the one or more liner lifting elements protrude out from the front side of the liner element to define associated lifting portions for allowing an engagement with a lifting tool. The system further includes one or more fastening bolts for fastening the liner element to the mill shell. A method for mounting and demounting a liner element to a mill shell of a mill is also disclosed.

4 Claims, 7 Drawing Sheets

(56) References Cited

U.S. PATENT DOCUMENTS

| | | | | |
|---|---|---|---|---|
| 11,167,289 B2 * | 11/2021 | Waters | .................... | B02C 17/22 |
| 12,138,634 B2 * | 11/2024 | Gray | ........................ | B02C 17/22 |
| 2002/0134871 A1 * | 9/2002 | Anderson | ............... | B02C 17/22 241/183 |
| 2020/0061626 A1 * | 2/2020 | Waters | .................... | B02C 17/22 |
| 2024/0269685 A1 | 8/2024 | Le Cras | | |

FOREIGN PATENT DOCUMENTS

| | | | |
|---|---|---|---|
| CL | 2020001626 | A1 | 1/2021 |
| CL | 2023003629 | A1 | 7/2024 |
| CN | 101342508 | A | 1/2009 |
| CN | 202527232 | U | 11/2012 |
| CN | 109890518 | A | 6/2019 |
| CN | 216830271 | U | 6/2022 |
| WO | 2009008810 | A1 | 1/2009 |
| WO | 2018102863 | A1 | 6/2018 |
| WO | 2018157201 | A1 | 9/2018 |

OTHER PUBLICATIONS

International Search Report and Written Opinion for International Application No. PCT/EP2022/065699, mailed Sep. 27, 2022.
Extended European Search Report for European Patent Application No. 21181260.7, dated Dec. 9, 2021.
Office Action and Search Report for Chinese Patent Application No. 2021110336555, issued Mar. 28, 2026.

* cited by examiner

Prior Art

SYSTEM AND METHODS FOR MOUNTING AND DEMOUNTING A LINER ELEMENT TO A MILL SHELL OF A MILL

CROSS-REFERENCE TO RELATED APPLICATIONS

This application is the U.S. national stage application of International Application PCT/EP2022/065699, filed Jun. 9, 2022, which international application was published on Dec. 29, 2022, as International Publication WO 2022/268517 A1 in the English language. The International Application claims priority European Patent Application No. 21181260.7 filed Jun. 23, 2021.

FIELD OF THE DISCLOSURE

The present disclosure relates to a system and methods for mounting and demounting a liner element to a mill shell of a mill, such as a tumbling mill.

BACKGROUND ART

Liner elements for mills, such as tumbling mills, often have dedicated lifting points for placement on the mill wall using a mill reline machine grapple. However, these lifting points are destroyed during mill operation. Consequently, spent liners must be 'knocked-in', a process where the liners are dislodged from the wall using a bolt hammer or similar tool and land on the mill charge below. Traditional lifting techniques are then used to pick up and remove the spent liners from the mill. These traditional lifting techniques require trained personnel to work alongside the mill reline machine to install lifting equipment, attach this equipment to the mill reline machine lifting points and finally, guide the load during the lifting process. To reduce the overall need for personnel, and thus provide a more efficient relining, there is a need for an improved method and system for allowing mill reline machines to use their grapple to both place new liners and remove spent liners directly from the mill wall with no assistance from personnel inside the mill.

SUMMARY

It is an object to mitigate, alleviate or eliminate one or more of the above-identified deficiencies in the art and disadvantages singly or in any combination. These and other objects are at least partly met by the invention as defined in the independent claims. Preferred embodiments are set out in the dependent claims.

According to a first aspect there is provided a system for mounting and/or demounting a liner element to a mill shell of a mill, said liner element having a back side arranged to face the mill shell and a front side arranged to face an interior of the mill, when mounted on the mill shell, the system comprising:

one or more liner lifting elements each structured and arranged to be fastened in a respective liner element through-hole such that said one or more liner lifting elements protrude out from the front side of the liner element to define associated lifting portions for allowing an engagement with a lifting tool; and one or more fastening bolts for fastening the liner element to the mill shell.

The system may be advantageous as it allows mounting new liner elements as well as removing worn our liner elements using a mill reline machine without the need for personnel being present within the mill. The unassisted pick up of liners directly from the mill wall provided by the present inventive concept is an important step in making mill relining more efficient and promotes greater autonomy for the relining process. Identifying and utilizing an interface on both new and spent liners is an important step in achieving unassisted relining. The system of the disclosure provides this interface by the one or more liner lifting elements which each present a respective lifting portion. Once the liner element has been mounted in its intended position, the one or more liner lifting elements can be removed and re-used for other liner elements. A further benefit of the system is that it effectively removes the need for using customised reline jigs. The reline machine grapple may be structured and arranged to engage with the lifting portions directly using a single grapple design applicable for both mounting and demounting the liner element to the mill shell.

The term "fastening bolt" should herein be construed as encompassing not only fastening bolts where the bolt head is integrally formed with the bolt body, but also combinations of two or more elements which together form the exact same function, such as e.g. a threaded pin engaging a nut.

Each of the one or more fastening bolts may be structured and arranged to fasten the liner element to the mill shell via a liner element through-hole and an associated mill shell through hole, respectively.

Each fastening bolt may be inserted from the inside of the mill. Each fastening bolt may then for example be fastened using a fastener, such as a fastening nut disposed at the outside of the mill shell.

Alternatively, each of said one or more fastening bolts may be inserted from outside the mill shell.

According to some embodiments, each of said one or more fastening bolts is structured and arranged to be inserted into an associated mill shell through-hole from outside the mill shell and to be threadedly engaged with the liner element. This may be advantageous as it allows the fastening to be made from outside the mill. Moreover, by threadedly engaging the fastening bolt with the liner element, no additional fastening element, such as e.g. a fastening nut, is needed which further simplified the fastening.

According to some embodiments, the lifting portion of each liner lifting element presents protrusions and/or recesses at an engagement surface thereof. Providing such protrusions and/or recesses may provide a better grip for the lifting tool. The protrusions and/or recesses may be embodied for example by providing a threaded or a ribbed engagement surface.

According to some embodiments, each liner lifting element comprises a tool engagement portion for engagement with a fastening tool. The tool engagement portion may be embodied in many ways. The tool engagement portion may for example be in the form of an opening having a non-circular rotational cross section disposed at an end of the liner lifting element, such as e.g. a female hexagonal portion adapted to be engaged with a hexagonal key. Alternatively, the tool engagement portion may be a portion of the liner lifting element having a non-circular rotational cross section. Such a cross section could for example be a hexagonal cross section adapted to be engaged by e.g. a wrench. A tool engagement portion may be advantageous as it allows engaging with a fastening tool during mounting and dismounting of the liner lifting elements.

According to some embodiments, each liner lifting element are further structured and arranged to be fastened in said respective liner element through-hole such that said one or more liner lifting elements protrude out from the back side of the liner element to define associated guide portions which, during a mounting of the liner element on the mill shell, are arranged to penetrate into associated mill shell through-holes thereby guiding the liner element into a mounting position at which the liner element is in abutment with the mill shell. This may be advantageous as the guide portions may facilitate the mounting process. The guide portions engage with the mill shell through-holes to guide the liner elements into its correct position, i.e. the mounting position. This makes it possible to mount liner elements also in absence of a supporting function, such as e.g. manual guidance by staff and/or an assistant system, such as a dedicated sensor system on the mill reline machine.

According to some embodiments, the guide portion of each liner lifting element is at least partly tapered. This may be advantageous as it facilitates entering the mill shell through-holes with the guide elements during mounting of the liner element.

According to some embodiments, each of the one or more fastening bolts is structured and arranged to partly, or completely, fill the respective liner element through-hole when the fastening bolt is fastened. This implies that the liner element through-holes may be plugged by means of the fastening bolts on the front side of the liner element. This may be advantageous as it may protect the liner element through-hole from damage during mill operation. Preferably, the fastening bolts are structured and arranged to completely fill the respective liner element through-holes when the fastening bolts are fastened. This may decrease the risk of damage to the openings of the liner element through-holes which faces the interior of the mill.

According to some embodiments, each of the one or more fastening bolts comprises a sacrificial end portion arranged to face an interior of the mill when the fastening bolt is fastened. This implies that the sacrificial end portion at least partly fills the respective liner element through-hole when "the fastening bolt is fastened. The sacrificial end portion may be advantageous as it allows further protecting the liner element through-hole from damage during grinding mill operation. As the liner element wears, the sacrificial end portion will wear down with it while maintaining its protective effect on the liner element interface through-hole.

According to some embodiments, the sacrificial end portion comprises a wear resistant material such as rubber, polyurethane, or steel. The wear resistant material may advantageously be the same as a wear resistant material of the liner element. This means that a sacrificing portion comprising rubber may be more appropriate for a liner element having a rubber wear portion, whereas a sacrificing portion comprising steel may be more appropriate for a liner element having a steel wear portion. However, it is conceivable that the wear resistant material of the sacrificial end portion is a different material than the material of the liner wear portion.

According to some embodiments, the sacrificial end portion comprises an outer portion arranged to face the interior of the mill and an inner resilient portion. This implies that the inner resilient portion interconnects the outer portion with the rest of the fastening bolt. This may be advantageous as it allows reducing the influence of impact on the fastening bolts having a sacrificial portion comprising a hard material such as steel. For such fastening bolts, there would otherwise be no means of damping impact forces which occur due to material hitting the sacrificial end portion on the inside of the mill during use. Such impact forces are unwanted as they increase the mechanical stress on the bolts and/or the liner element though-openings and may lead to mechanical damage thereof.

According to some embodiments, each of said one or more liner lifting elements has a threaded fastening portion for fastening the liner lifting element to an associated liner element through-hole by threaded engagement. The threaded engagement is a preferred fastening means as it is reliable. However, other fastening means are conceivable, such as e.g. a snap fit fastening system.

According to some embodiments, each liner lifting element and each fastening bolt are structured and arranged to threadedly engage with an inner threaded portion of the associated liner element through-hole. This embodiment implies that the threaded fastening portion of the liner lifting element has the same properties as a threaded fastening portion of the fastening bolts. This may be advantageous as it allows a simplified system as both the liner lifting elements and the fastening bolts share one and the same fastening portion.

According to a second aspect there is provided a liner assembly for a mill comprising:

- a system according to the first aspect; and
- a liner element having a back side arranged to face the mill shell and a front side arranged to face an interior of the mill, when mounted on the mill shell, wherein the liner element comprises one or more liner element through-holes each extending from the back side to the front side and presenting a respective inner threaded portion for threadedly engaging with an associated one of said one or more fastening bolts.

According to some embodiments, the liner element comprises a backing plate arranged at the back side of the liner element. The backing plate may be equipped with tapped through-holes providing said threaded portion. The liner element may further comprise a main wear portion arranged on the backing plate. The liner element may however further comprise a steel reinforcement portion arranged on the main wear portion. This steel reinforcement portion may be preferred for liner elements having a main wear portion comprising a resilient material, such as rubber or polyurethane.

For some liner elements, such as e.g. liner elements having a main wear portion made of steel or other hard metal or metal alloy, the liner element may comprise the backing plate and the main wear portion only. Alternatively, the liner element may be provided without a backing plate. Such liner elements may be integrally formed from one piece of material, such as e.g. steel or a steel alloy. This implies that the inner threaded portions of the liner element through-holes may also be integrally formed in the liner element.

A cross sectional area of said one or more liner element through-holes may be larger in through-hole portions connecting to the front side of the liner element than in through-hole portions connecting to the back side of the liner element. This may be advantageous as providing a somewhat oversized hole at the front side of the liner element may prevents peening from excessively reducing the hole size during use.

For liner elements having a main wear portion and a steel reinforcement portion, the cross sectional area of said one or more liner element through-holes may be larger in through-hole portions extending through the steel reinforcement portion than in through-hole portions extending through the main wear portion.

According to a third aspect there is provided a method for demounting a liner element from a mill shell of a mill, said liner element having a back side arranged to face the mill shell when mounted, and a front side arranged to face an interior of the mill, the method comprising:

a) unfastening, and removing, one or more fastening bolts from the liner element;

b) fastening one or more liner lifting elements in one or more associated liner element through-holes such that said one or more liner lifting elements protrude out from the front side of the liner element to define associated lifting portions;

c) engaging a lifting tool with at least one of said associated lifting portions; and d) removing by means of a lifting tool the liner element from the mill shell.

According to some embodiments, said one or more fastening bolts are unfastened, and removed, from said one or more associated liner element through-holes of the liner element from outside the mill shell. In other words, the one or more fastening bolts may be removed from outside the mill shell.

The one or more liner lifting elements may be inserted from outside the mill shell. This implies inserting the one or more liner lifting elements into said one or more associated liner element through-holes via associates mill shell through-holes. The one or more liner lifting elements may be fastened from outside the mill shell. This implies that the one or more liner lifting elements may be engageable by a fastening tool from outside the mill shell. Alternatively, the one or more liner lifting elements may be inserted from inside the mill shell. The one or more liner lifting elements may be fastened from inside the mill shell.

According to a fourth aspect there is provided a method for mounting a liner element having a back side arranged to face the mill shell when mounted, and a front side arranged to face an interior of the mill, the method comprising:

a) fastening one or more liner lifting elements in one or more associated liner element through-holes such that said one or more liner lifting elements protrude out from the back side of the liner element to define associated guide portions and protrude out from the front side of the liner element to define associated lifting portions;

b) engaging a lifting tool with at least one of said associated lifting portions;

c) lifting by means of the lifting tool the liner element into a position with respect to the mill shell at which the one or more liner lifting elements axially coincide with one or more associated mill shell through-holes;

d) displacing by means of the lifting tool the liner element into a mounting position at which the liner element is in abutment with the mill shell by allowing said associated guide portions to penetrate into said one or more associated mill shell through-holes, thereby guiding the liner element into said mounting position;

c) fastening the liner element to the mill shell by at least one fastening bolt; and f) removing said one or more liner lifting elements.

According to some embodiments, said one or more liner lifting elements are removed from outside the mill shell, and the liner element is fastened to the mill shell from outside the mill shell by inserting said at least one fastening bolt into associated mill shell through-holes from outside the mill shell, and threadedly engaging said at least one fastening bolt with the liner element.

As readily appreciated by the person skilled in the art, for liner elements having two or more liner element through-holes, and where two one or more liner lifting elements are used, the step of fastening the liner element to the mill shell by at least one fastening bolt and the step of removing said one or more liner lifting elements may be undertaken interchangeably. Once the liner element has been displaced into the mounting position, a first liner lifting element may be removed to reveal the threaded engagement portion of the associated liner element through-hole. A fastening bolt may then be introduced to fasten the liner element to the mill shell at that hole. This process may then be continued.

As readily appreciated by the person skilled in the art, the method for mounting a liner element disclosed herein may equally well be performed in reverse thereby defining a method for removing a liner element from a mill shell of a mill.

Effects and features of the second, third and fourth aspects are largely analogous to those described above in connection with the first aspect. Embodiments mentioned in relation to the first aspect are largely compatible with the second, third and fourth aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The disclosure will by way of example be described in more detail with reference to the appended drawings, which shows presently preferred embodiments of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Tumbling mills comprises large rotary grinding drums into which material to be grinded are input. As a result from abrasive as well as impact wear, the walls of the drum, herein referred to as the mill shell, needs to be equipped with a wear resistant lining. Such lining often comprises a plurality of liner elements which are mounted together to form a single inner wear surface interacting with the material in the interior of the mill. Once the lining is worn out, it will need to be replaced. For this purpose mill reline machines are typically used to replace one or more liner elements. The present inventive concept has been developed to meet requirements in this area. The inventive concept relates to a system and a method for mounting a liner element to a mill shell of a mill, such as a tumbling mill. Before describing the method, the different parts of the system will be described in detail with reference to FIGS. 1-9.

Figure 1:
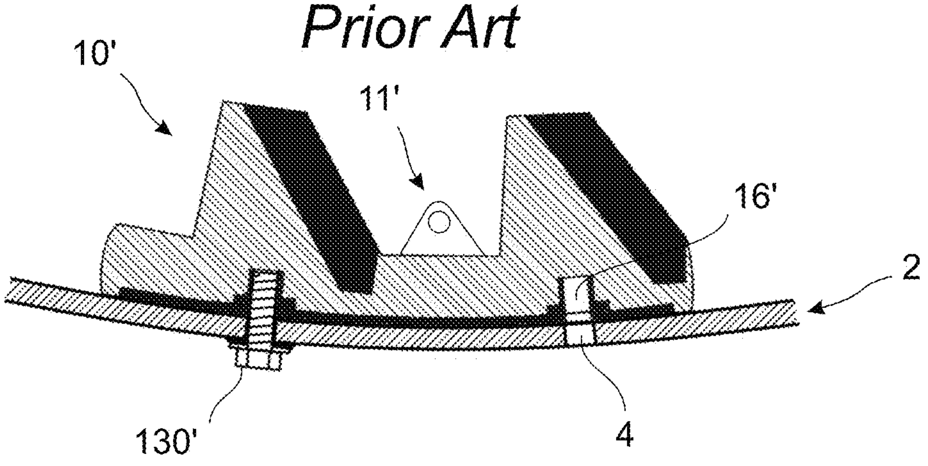
FIG. 1 shows a cross-sectional side view of a liner element for a mill known from the prior art.

FIG. 1 shows a lining element 10' known from the prior art. The liner element 10' illustrated here in its mounting position with respect to the mill shell 2. As can be seen, the liner element 10' is fastened to the mill shell 2 from the outside by means of conventional fastening bolts 130'. There are disadvantages with the lining element 10'. A first disadvantage is that in order to lift the liner element 10' to the mounting position, dedicated lifting points (11') must be provided on the liner element 10' for a mill reline machine to be able to engage with, and lift, the liner element 10'. Such dedicated lifting points could be for example protruding hooks, or holes. Such lifting points are easily destroyed during operation of the mill, which may make it difficult to remove the liner element once it has been worn out and in need of replacement. Another potential disadvantage of the liner element 10' is that, since it is fastened to the mill shell from the outside, it may be challenging to manoeuvre some mill reline machines to lift the liner element into the correct position with respect to the mill shell, at which position, the liner element holes 16' are axially coinciding with the mill shell through-holes 4.

The inventive concept presented here aims to solve both these problems at the same time by providing liner elements having through-going holes, here termed "liner element through-holes" and dedicated elements, here termed "liner lifting elements" which elements have both a guiding function to facilitate guiding the mill reline machine to manoeuvre the liner element to the correct position, and an engaging function providing dedicated lifting points for the mill reline machine. The inventive concept should however not be construed as limited to the combination of these two functions. Rather, as mill reline machines at some facilities may be perfectly capable of guiding a liner element to a correct position without the need for the disclosed guiding functionality, e.g. by means of a supporting function, such as e.g. manual guidance by staff and/or an assistant system, such as a dedicated sensor system on the mill reline machine, the liner lifting elements of the disclosure may alternatively be embodied without dedicated guiding portions.

Example embodiments of the liner elements 10 and 10" of the inventive concept will first be described with reference to FIGS. 2 and 3 whereas the liner lifting elements will be described with reference to FIGS. 4 and 5.

Figure 2:
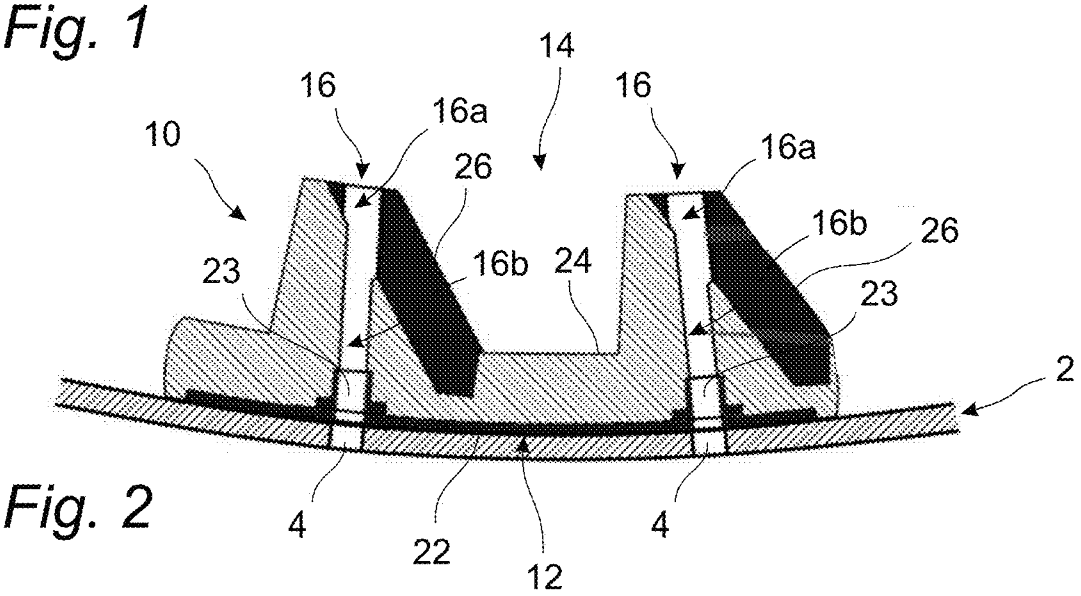
FIG. 2 shows a cross-sectional side view of a liner element for a mill according to a first example embodiment of the present disclosure.

FIG. 2 illustrates the liner element 10 according to a first example embodiment of the inventive concept. The liner element 10 has a back side 12 arranged to face the mill shell 2 and a front side 14 arranged to face an interior of the mill, when mounted on the mill shell 2. The liner element 10 comprises one or more liner element through-holes 16 each extending from the back side 12 to the front side 14. FIG. 2 illustrates two such liner element through-holes 16, but as readily appreciated by the person skilled in the art, there may be any number of liner element through-holes for the liner element according to the inventive concept. Each liner element through-hole 16 presents a respective inner threaded portion 23 for threadedly engaging with fastening bolts 130, as will be detailed later. The liner element 10 comprises a backing plate 22 arranged at the back side 12 of the liner element 10. The backing plate provides structural support for the liner element and also presents the inner threaded portions 23, which forms a part of the backing plate 22 for example as a tapped hole formed therein. A main wear portion 24 is arranged on the backing plate 22. The main wear portion 24 comprises a wear resistant material such e.g. as rubber or polyurethane. The liner element 10 further comprises two steel reinforcement portions 26 which are arranged on the main wear portion 24. The purpose of the steel reinforcement portions 26 are to provide extra protection and wear resistance at the most active surfaces of the mill at which the degree of material wear is especially high. As can be seen in FIG. 2, the cross-sectional area of the liner element through-hole 16 is larger in through-hole portions 16*a* extending through the steel reinforcement portion 26 than in through-hole portions 16*b* extending through the main wear portion 24. The reason for this is to ensure that the entrance opening of the liner element through-holes 16 at the front side 14 of the liner element 10 will not be reduced in size due to peening of the steel reinforcement portion 26.

The invention should not be construed as limited to wear liners of the kind illustrated in FIG. 2. The invention is equally applicable for steel liner elements as will be described below.

Figure 3:
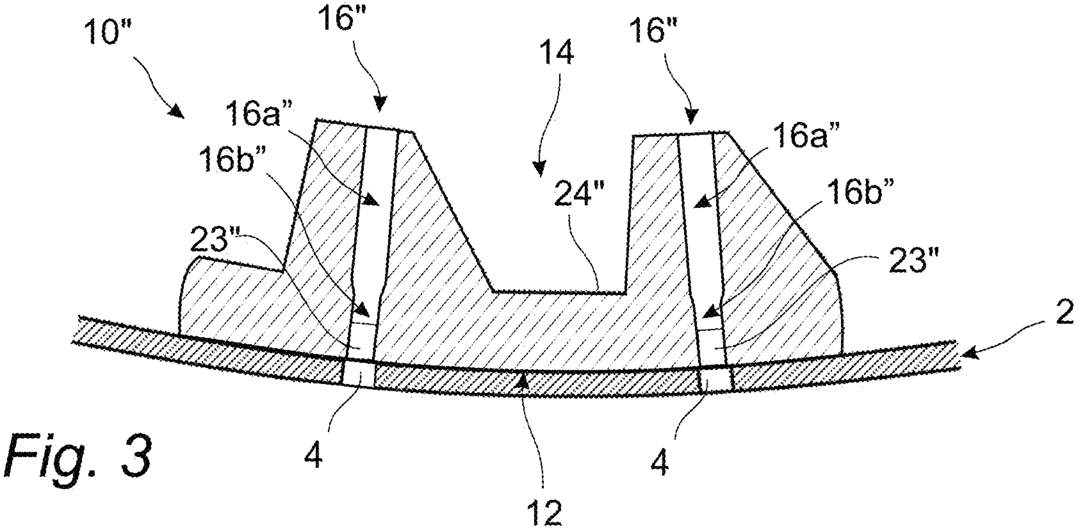
FIG. 3 shows a cross-sectional side view of a liner element for a mill according to a second example embodiment of the present disclosure.

FIG. 3 illustrates a liner element 10" according to a second example embodiment of the inventive concept. The liner element 10" has many features in common with the liner element 10 of the first example embodiment but differs in that the liner element 10" is integrally formed from one piece of material, wear element 24", which in this example embodiment is a steel element. Consequently, the liner element 10" is provided without a backing plate and does also not comprise a dedicated steel reinforcement portion as the first example embodiment. The inner threaded portions 23" of the liner element through-holes 16" is also integrally formed in the liner element 10". As can be seen in FIG. 3, the cross sectional area of the one or more liner element through-holes 16" is larger in through-hole portions 16*a*" which connects to the front side 14 of the liner element 10" than in through-hole portions 16*b*" which connects to the back side 12 of the liner element 10". The reason for this is the same as described with reference to liner element 10 in FIG. 2, namely to ensure that the entrance opening of the liner element through-holes 16" at the front side 14 of the liner element 10" will not be reduced in size due to peening of the wear element 24".

A liner lifting element will now be described with reference to FIGS. 4 and 5.

Figure 4:
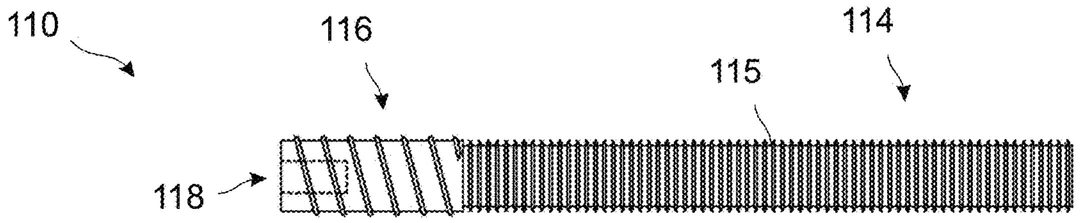
FIG. 4 shows a side view of a liner lifting element according to a first example embodiment of the present disclosure.

FIG. 4 illustrates a liner lifting element 110 according to a first example embodiment. The liner lifting element 110 has at a first end thereof a lifting portion 114 which presents protrusions and/or recesses at an engagement surface 115 thereof. For the example embodiment, the protrusions and/or recesses are embodied by a plurality of ribs. Other geometries are conceivable, such as e.g. threads. The purpose of the lifting portion 114 is to provide lifting points for the mill reline machine as will be further described later. The liner lifting element 110 further has a threaded fastening portion 116 for fastening the liner lifting element 110 to an associated liner element through-hole 16,16" by threaded engagement. For the example embodiment, the threaded fastening portion 116 is structured and arranged to threadedly engage with the inner threaded portion 23 of the backing plate 22 in the liner element 10,10". The liner lifting element 110 further comprises a tool engagement portion 118 at a second, opposite, end thereof. The tool engagement portion 118 is in the form of an opening having a non-circular rotational cross section. This could for example be a female hexagonal portion adapted to engage with a hexagonal key, but other geometries are also conceivable, such as square, triangular or rectangular/slotted cross sections, or hexalobular cross sections, such as e.g. Torx.

Figure 5:
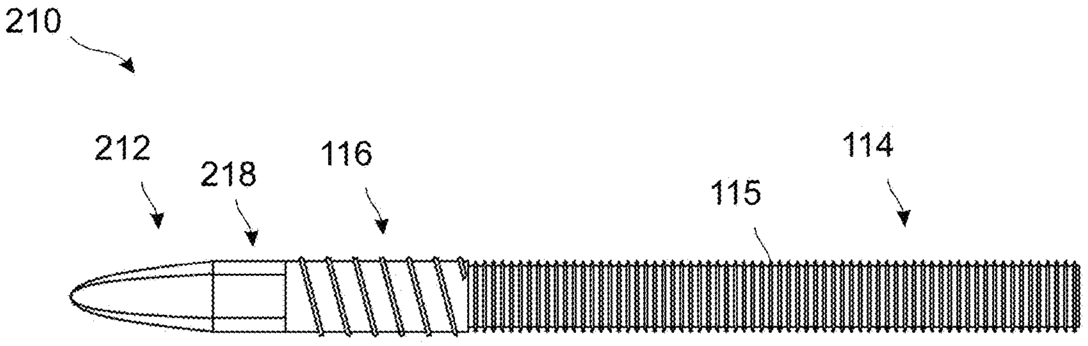
FIG. 5 shows a side view of a liner lifting element according to a second example embodiment of the present disclosure.

FIG. 5 illustrates a liner lifting element 210 according to a second example embodiment. The liner lifting element 210 differs from the liner lifting element 110 in that it further comprises a guide portion 212 which is at least partly tapered. The purpose of the guide portion 212 will be discussed later. The guide portion 212 of the liner lifting element 210 has a tool engagement portion 218 for allowing it to be engaged by a fastening tool such as a wrench. Instead of being disposed at an end of the liner lifting element, as for the first example embodiment, the tool engagement portion 218 is thus defined on the outside of the guide portion 212. The tool engagement portion 218 may be embodied for example by providing flats engineered into the surface of the liner lifting element 210 adapted to be engaged with a tool such as a wrench. For this purpose, the tool engagement portion 218 may for example have a hexagonal or square cross section.

As can be seen in FIGS. 4 and 5, the liner lifting element 110,210 has an elongate extension and may be integrally formed. It is however also conceivable that the liner lifting element 110,210 comprises two or more interconnected parts. The liner lifting element 110,210 may be entirely made of, or comprise, steel or alloyed steel.

Figure 6:
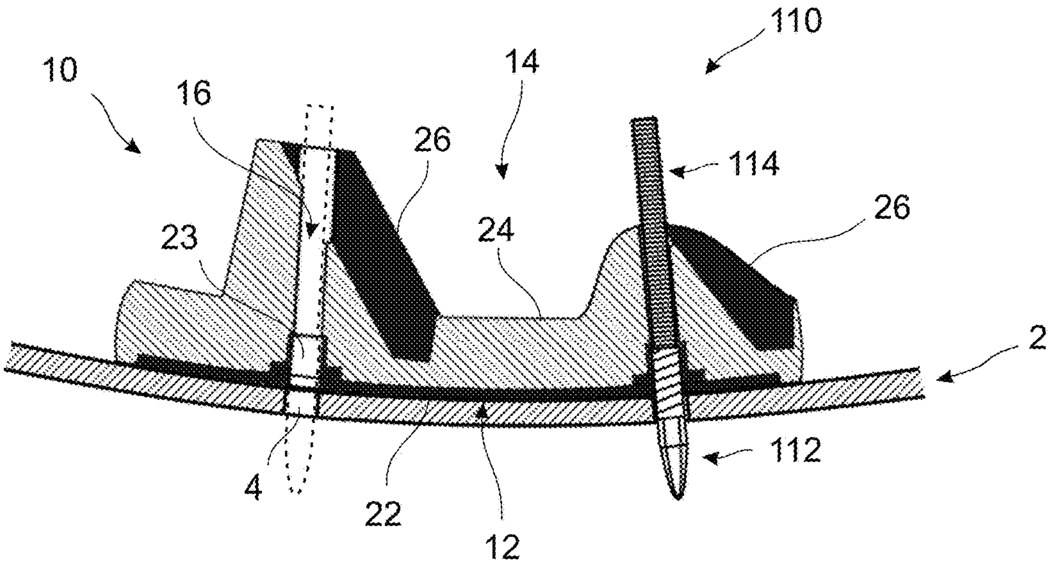
FIG. 6 shows a cross-sectional side view of the liner element of FIG. 2 and a liner lifting element of the kind illustrated in FIG. 5 positioned into a liner element through-hole of the liner element.

FIG. 6 illustrates liner element 10 together with liner lifting element 210. As illustrated in FIG. 6, the liner lifting element 210 is structured and arranged to be fastened in a respective liner element through-hole 16 of the liner element 10. The liner lifting element 210 is structured and arranged to be fastened is such a way that it protrudes out on both the front side 14 and the back side 12 of the liner element 10. The liner lifting element 210 protrude out from the back side 12 of the liner element to define the guide portion 112 which, during mounting of the liner element on the mill shell 2, is arranged to penetrate into associated mill shell through-holes 4 thereby guiding the liner element 10 into a mounting position at which the liner element is in abutment with the mill shell 2. The liner lifting element 210 protrude out from the front side 14 of the liner element 10 to define a lifting portion 114 for allowing an engagement with a lifting tool. This functionality will be further described later. In FIG. 6, the right-hand section of the liner element 10 has been illustrated in a worn state to illustrate how it would typically look when inserting the liner lifting element 210 prior to a replacement of the liner element 10. As readily appreciated by the person skilled in the art, inserting the liner lifting element 210 into the liner element through-hole 16 of the right-hand section of the liner element 10, would still allow a portion (i.e. the lifting portion 114) of the liner lifting element 210 to protrude out from the front side 14 of the liner element 10 as also illustrated by the dashed line in FIG. 6.

Although not illustrated here, liner lifting element 110 will engage in a similar way with a liner element, such as the liner element 10. As readily appreciated by the person skilled in the art, the only difference will be that, as the liner lifting element 110 lacks a guide portion, it will not protrude on the outside of the mill shell 2. The reader is referred to FIG. 11 which illustrates the liner lifting element 110 in use together with liner element 10.

Figure 7A:
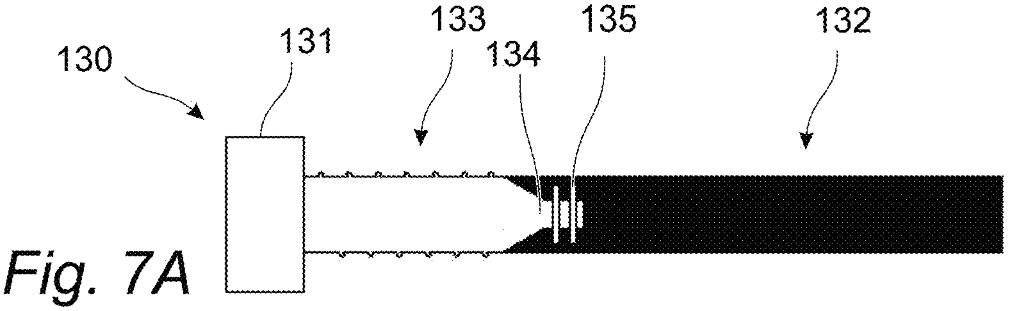
FIG. 7A shows a cross-sectional side view of a fastening bolt according to a first example embodiment of the present disclosure.
Figure 7B:
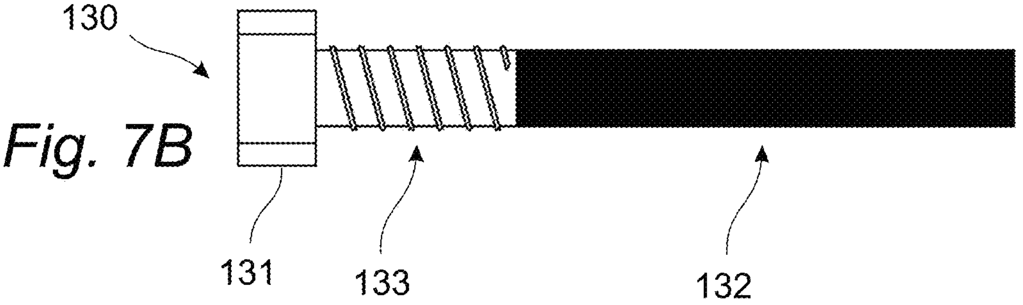
FIG. 7B shows a side view of the fastening bolt of FIG. 7A.

FIGS. 7A-B illustrate a fastening bolt 130 according to a first example embodiment of the inventive concept. The fastening bolt 130 is similar to a conventional bolt in the sense that it comprises a bolt head 131 arranged at one end thereof, said bolt head 131 being shaped such that it is engageable by a hand tool (e.g. hexagonal or any other for the purpose suitable cross section) followed by a threaded fastening portion 133 which is structured and arranged to threadedly engage with the inner threaded portion 23 of the liner element 10,10" when fastening the liner element 10,10" to the mill shell 2. The fastening bolt 130 differs from conventional bolts in that it further comprises a sacrificial end portion 132 arranged at an opposite end thereof. The sacrificial end portion 132 is arranged to face an interior of the mill and at least partly fill the liner element through-hole 16 when the fastening bolt 130 is fastened. The sacrificial end portion 132 may comprise a wear resistant material such as rubber or polyurethane. The sacrificial end portion 132 may further comprise a steel core 134 which is used to interconnect the sacrificial end portion 132 with the rest of the fastening bolt 130. The wear resistant material encloses the steel core 134 such that it is not visible from the outside. The steel core may further comprise one or more steel ribs 135 which further strengthen the interconnection. When the sacrificial end portion 132 is made from a resilient wear resistant material such as rubber or polyurethane, the sacrificial end portion 132 will act as a damper to reduce the influence of impact forces on the fastening bolts 130 occurring when mill material repeatedly hits then during operation.

Figure 8A:
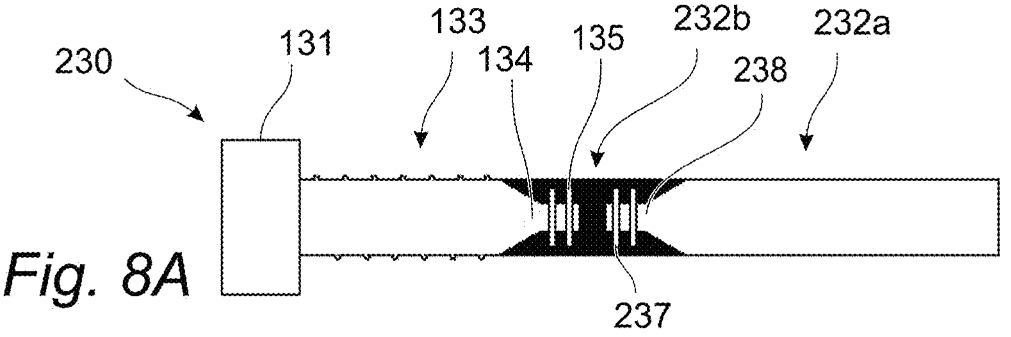
FIG. 8A shows a cross-sectional side view of a fastening bolt according to a second example embodiment of the present disclosure.
Figure 8B:
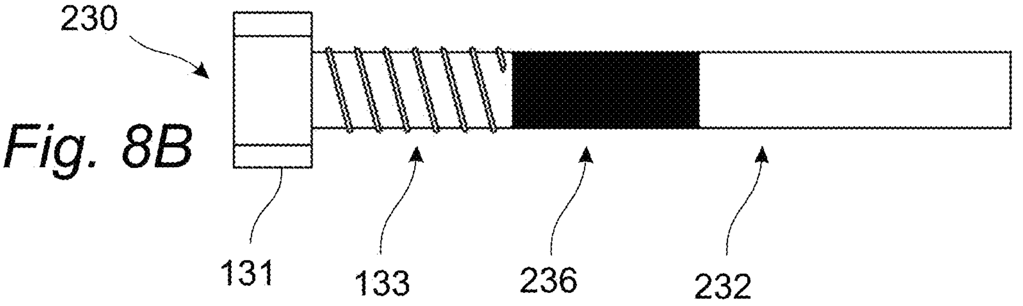
FIG. 8B shows a side view of the fastening bolt of FIG. 8A.

FIGS. 8A and B illustrates a fastening bolt 230 according to a second embodiment of the inventive concept. The fastening bolt 230 differs from the fastening bolt 130 according to the first example embodiment in that the sacrificial end portion 232 comprises an outer steel portion 232*a* arranged to face the interior of the mill and an inner resilient portion 232*b*. This geometry is especially suitable for use in liner elements made from hard wear resistant materials such as steel, such as e.g. the liner element 10". The reason is that it allows using a hard wear resistant material in the sacrificial end portion 232 (for example the same hard wear resistant material as used in the liner element) and at the same time provide impact damping for reducing the influence of impact forces on the fastening bolts 230. The damping is here achieved by the inner resilient portion 232*b*, which may be made from any resilient material such as rubber or polyurethane. As illustrated in FIG. 8A, the outer portion 232*a* interconnects with the inner resilient portion 232*b* by core 238 having ribs 237 being embedded in resilient material of the inner resilient portion 232*b*. The inner resilient portion 232*b* interconnects with the rest of the fastening bolt 230 in the same way as described for fastening bolt 130.

Figure 9:
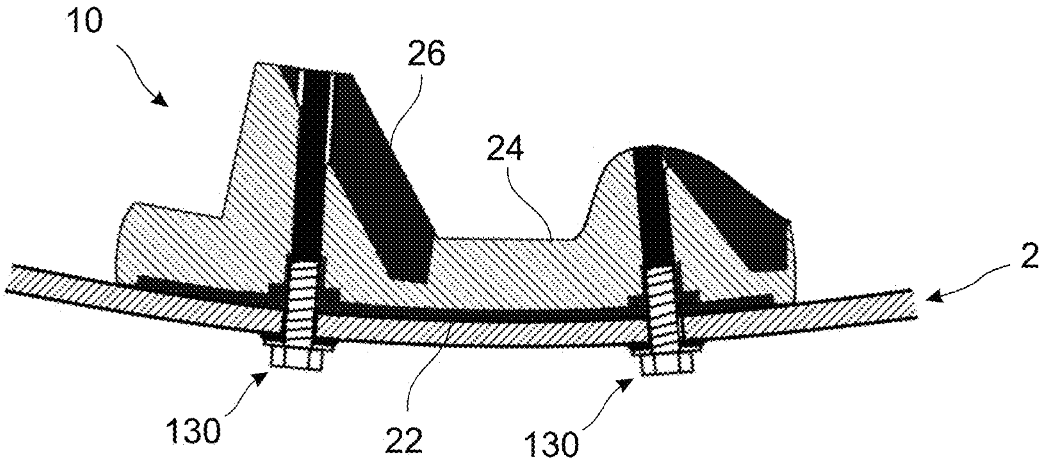
FIG. 9 shows a cross-sectional side view of the liner element of FIG. 2 and fastening bolts of the kind illustrated in FIGS. 7A and B positioned into liner element through-holes of the liner element.

FIG. 9 illustrates fastening bolts 130 according to the first example embodiment when in use for fastening a liner element 10 in a mill. The liner element 10 is again illustrated here with its left-hand section unaffected by wear, and its right-hand section relatively strongly affected by wear. As can be seen, when the fastening bolts 130 are used to fasten a new liner element 10 to a mill shell 2 (left-hand section of the liner element 10 of FIG. 9), the fastening bolt 130 protrudes all the way through the liner element through-hole 16 so as to completely fill the same. This prevents material from entering the liner element through-hole 16 and damage it. As the mill is in operation, the liner element 10 will wear and the sacrificial end portion 132 will wear with the wear of the liner element 10 (right-hand section of the liner element 10 of FIG. 9). Thus, even after extensive wear, the portion of the liner element through-hole 16 still in existence will have been protected by the portion of the fastening bolt 130 still in existence. As the fastening bolt 130 is removed, an undamaged liner element through-hole 16 will be revealed. As readily appreciated by the person skilled in the art, arranging the fastening bolt 230 in the liner element 10" will provide a similar functionality.

The fastening bolts 130,230 are structured and arranged to partly, or completely, fill the respective liner element through-hole 16 when the fastening bolt 130,230 is fastened. Preferably, the fastening bolts 130,230 are completely filling the liner element through-holes 16. However, it is conceivable that they only partly fill the liner element through-holes 16. In the latter case, a recently installed liner element may present openings on the front side 14 having a certain depth. After a certain degree of wear during use, the liner element 10,10" will wear down which effectively will move the front side 14 with respect to the fastening bolts 130 until the sacrificing end portions 132,232 becomes flush with the front side 14 of the liner element 10,10". At that time and onwards, the sacrificing end portions 132,232 will wear down together with the liner element 10, 10" as will be described above.

Although the inventive concept is presented here with fastening bolts 130;230 which are inserted and fastened from outside the mill shell, the inventive concept should not be construed as limited to such fastening bolts only. As an alternative, each fastening bolt may instead be inserted from the inside of the mill. Each fastening bolt may then be fastened by a fastener, such as e.g. a fastening nut, disposed at the outside of the mill shell. As readily appreciated by the person skilled in the art, the fastening bolts for such embodiments of the invention will be structurally different from the fastening bolts 130;230 described herein. For example, one kind of fastening bolts well known in the art presents bolt heads having a nonuniform rotational cross sections configured to fit in a geometrically complementary liner element through hole of the liner element for preventing the fastening bolts to rotate with respect to the liner element during fastening thereof. As such fastening bolts are well known in the art, they are not further described here.

Different parts of the inventive concept have now been described in detail with reference to FIGS. 2-9. It will now be described how these parts are used together. One or more liner lifting elements 110,210 and one or more fastening bolts 130;230 may together define a system for mounting a liner element 10,10" to a mill shell 2 of a mill. A liner assembly may also be defined. Said liner assembly comprises the fastening system and a liner element 10,10" according to the inventive concept.

A method for mounting a liner element to a mill shell of a mill will now be described with reference to FIGS. 10A-G. The method will here be described for liner element 10 and fastening bolts 130, but is equally applicable for other embodiments described herein, and any other embodiments not described herein but within the scope of the appended claims.

Figure 10A:
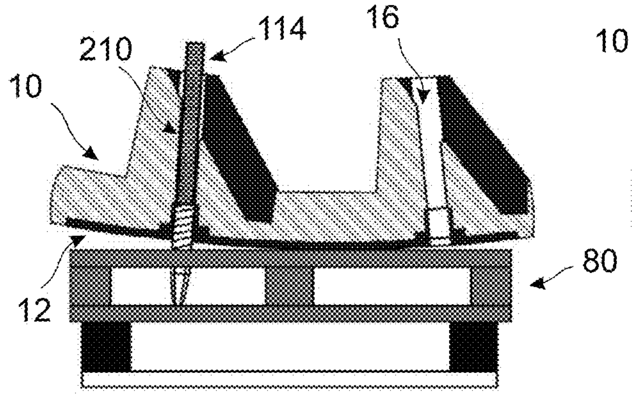
FIG. 10 shows cross-sectional side views of the liner element of FIG. 2 during mounting thereof on a mill shell using the liner lifting elements of FIG. 5.

The method for mounting a liner element to a mill shell of a mill comprises fastening one or more liner lifting elements 210 in one or more associated liner element through-holes 16 such that said one or more liner lifting elements 210 protrude out from the back side 12 of the liner element 10 to define associated guide portions 212 and protrude out from the front side 14 of the liner element 10 to define associated lifting portions 114. The liner lifting elements 210 may be fastened in advance, or just prior to mounting the liner element 10. As illustrated in FIG. 10A, the liner element 10 may be supported on a liner cart 80 oriented such that the front side 14 of the liner element 10 is facing upwardly. The liner cart 80 of the example has an open structure thus allowing for the guiding portions 212 of the liner lifting elements 210 to protrude out from the back side 12 of the liner element 10 without making contact with the liner cart 80 and/or the supporting structure on which it rests. The liner lifting elements 210 of the example embodiment are inserted from the back side 12 of the liner element 10. It is however conceivable to have liner lifting elements which also can be introduced from the front side 14 of the liner element 10.

The method further comprises engaging a lifting tool 60 with at least one of said associated lifting portions 114. The lifting tool 60 is operated by the mill reline machine. There are many alternative ways of lifting the liner element 10 by engaging the lifting portions 114 of the liner lifting elements 110 according to the inventive concept. Therefore, the lifting tool 60 is only schematically indicated herein.

Figure 10B:
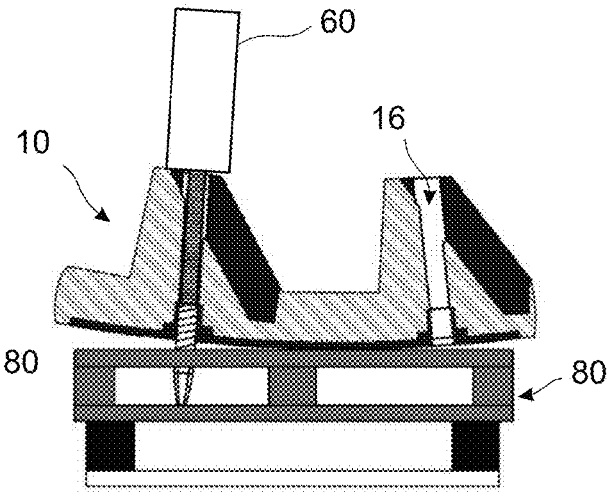
Figure 10C:
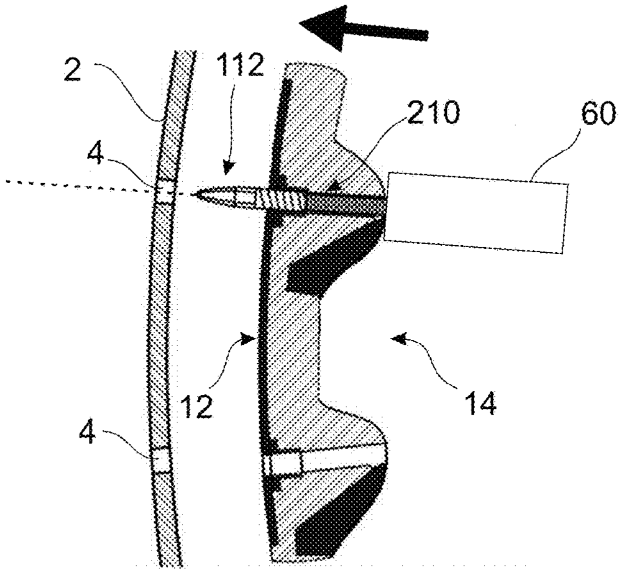

The method further comprises lifting by means of the lifting tool 60 the liner element 10 into a position with respect to the mill shell 2 at which the one or more liner lifting elements 210 axially coincide with one or more associated mill shell through-holes 4. This is illustrated in FIGS. 10B and C. Once the liner element 10 has been lifted into the position illustrated in FIG. 10C, the method further comprises displacing by means of the lifting tool 80 the liner element 10 into a mounting position at which the liner element 10 is in abutment with the mill shell 2. The displacement operation is illustrated in FIG. 10C and the mounting position has been reached in FIG. 10D. The displacement operation is aided by the liner lifting elements 210. By allowing the associated guide portions 212 of the liner lifting elements 210 to penetrate into the mill shell through-holes 4, the liner element 10 will be guided into the mounting position.

Figure 10D:
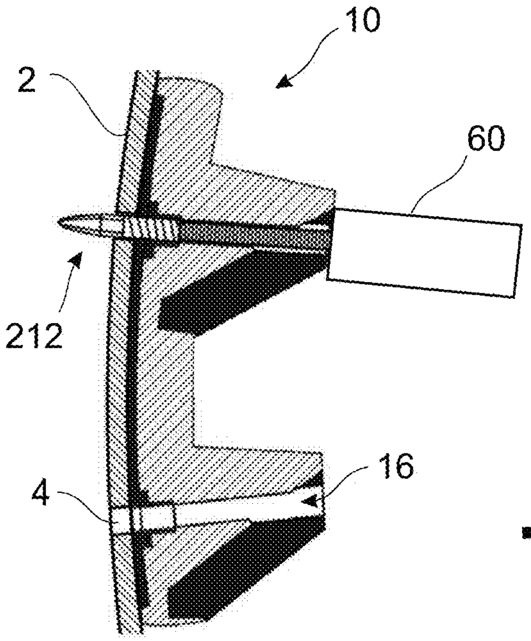
Figure 10E:
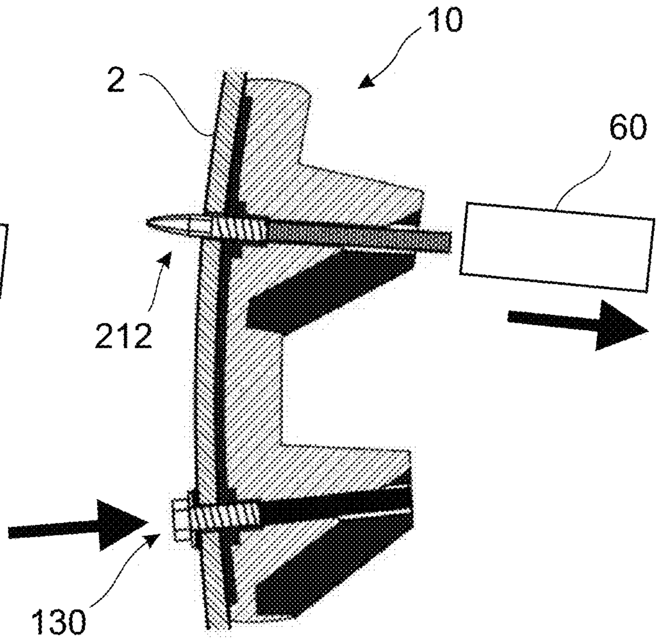

The method further comprises fastening the liner element 10 to the mill shell 2 by at least one fastening bolt 130. This is illustrated in FIG. 10E. To make sure that the liner element 10 is not falling down before being fastened, the mill reline machine may be operated to via the lifting tool 60 press the liner element 10 firmly towards the mill shell 2 as indicated in FIG. 10D. Once the first fastening bolts 130 have been secured to the liner element 10, the lifting tool 60 may be disengaged from the lifting portions 114 and removed from the liner element 10, as illustrated in FIG. 10E.

Figure 10F:
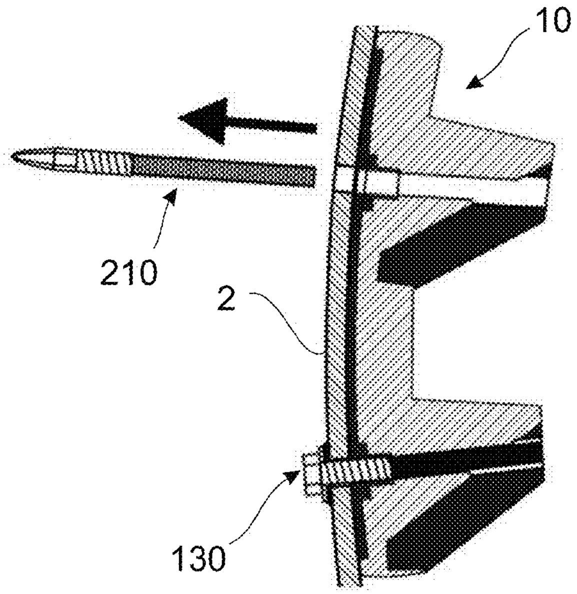
Figure 10G:
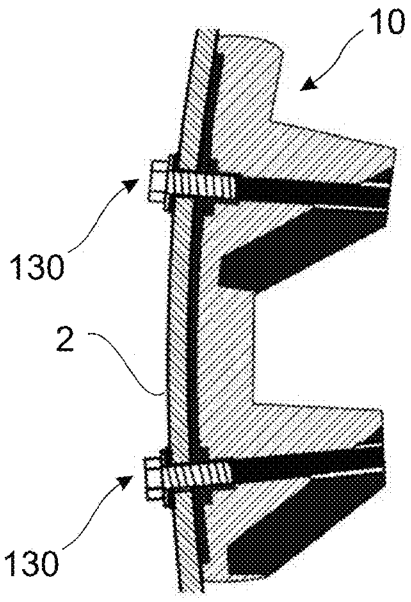

The method further comprises removing the one or more liner lifting elements 210 from the liner element 10. This is illustrated in FIG. 10F. FIGS. 10E-G clearly illustrates that fastening a fastening bolt 130 and removing a liner lifting element 210 may be made interchangeably if there are more than one liner element through-hole 16 in the liner element. Dependent on the liner element used, the number of liner lifting elements 210 and/or fastening bolts 130 may differ.

As readily appreciated by the person skilled in the art it is not essential that the number of liner lifting elements 110 and fastening bolts 130 are equal. To fasten a liner element to a mill shell, two, four or even more fastening bolts may be needed dependent on the liner element dimensions, the dimensions of the fastening bolts, and the physical requirements for the mill. However, for lifting, and guiding, a liner element to a mounting position on the mill shell, it may suffice with only one liner lifting element. However, preferably two liner lifting elements 210 are used to provide better stability during the lift procedure, as well as more accurate guiding towards of the liner element towards the mounting position.

As readily appreciated by the person skilled in the art, the method may also be performed using liner lifting elements 110 according to the first example embodiment. The difference to the described method is merely that the method steps related to the guiding are not undertaken. The mill reline machine must in this case be able to accurately place the liner element at a correct position without any guidance from the liner lifting elements.

As readily appreciated by the person skilled in the art, the same general procedure may be used when demounting a worn-out liner element from the mill, although in reverse. This is illustrated in FIG. 11. As can be seen, the method for demounting the liner element is here illustrated using the liner lifting element 110 according to the first example embodiment. The reason is that the guide functionality provided by the guide portions 212 of lifting elements 210 is primarily of interest when mounting a liner element, not when demounting it. Choosing to illustrate the method to demount a liner element using the first example embodiment thus serves to highlight this difference.

Figure 11A:
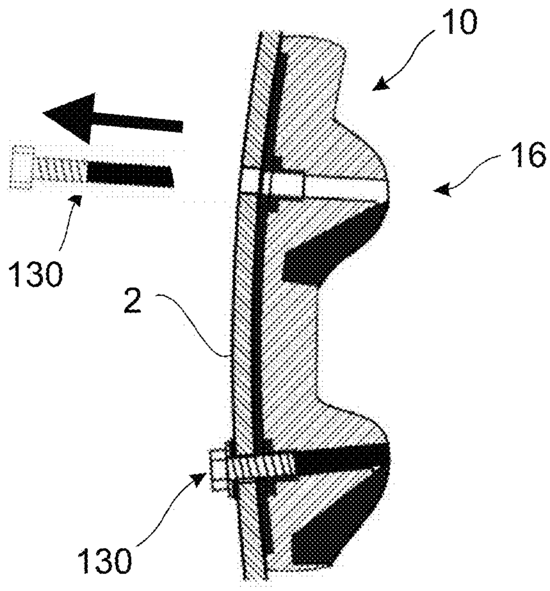
FIG. 11 shows cross-sectional side views of the liner element of FIG. 2 during demounting thereof from a mill shell using the liner lifting elements of FIG. 4.
Figure 11B:
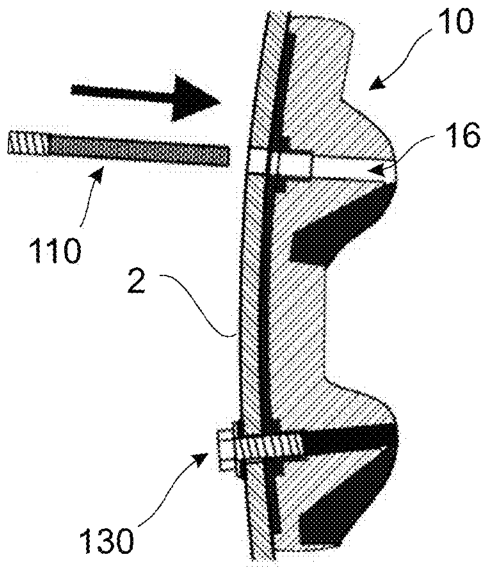
Figure 11C:
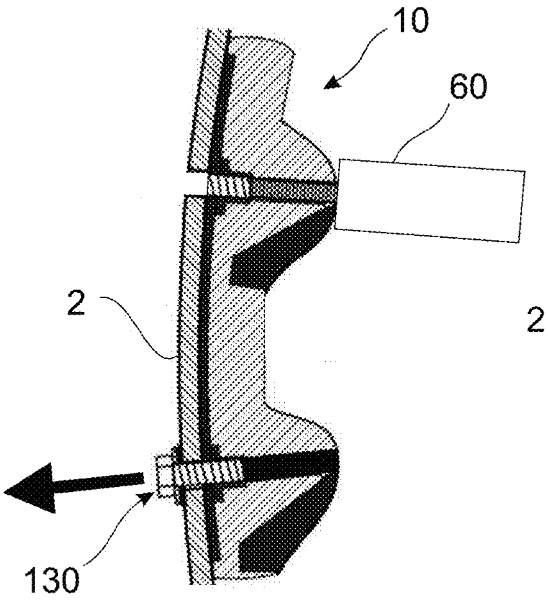
Figure 11D:
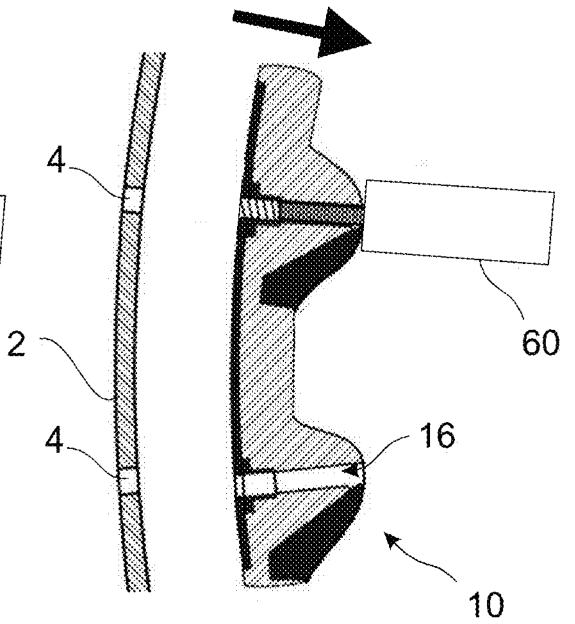

First, one or more fastening bolts 130 are unfastened, and removed, from the liner element 10 as illustrated in FIG. 11A. In the example embodiment, they are removed from outside the mill shell 2. One or more liner lifting elements 110 are then inserted in its place as illustrated in FIG. 11B. The one or more liner lifting elements 110 may also be inserted from outside the mill shell 2, but alternatively they may be inserted from inside the mill shell 2. Once correctly positioned and fastened in their associated liner element through-holes 16, the mill reline machine can be operated to manoeuvre the lifting tool 60 to engage with lifting portions 114 of at least one liner lifting element 110, as illustrated in FIG. 11C. When the liner element 10 is held firmly in position against the mill shell 2 by the mill reline machine, the remaining fastening bolts 130 may be removed as illustrated in FIG. 11C. Finally, when all fastening bolts 130 have been removed, the mill reline machine may manoeuvre the lifting tool 60 to remove the liner element 10 from the mill shell 2.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A method for demounting a liner element from a mill shell of a mill, said liner element having a back side arranged to face the mill shell when mounted, and a front side arranged to face an interior of the mill, the method comprising:

a) unfastening, and removing, one or more fastening bolts from the liner element;

b) fastening one or more liner lifting elements in one or more associated liner element through-holes such that said one or more liner lifting elements protrude out from the front side of the liner element to define associated lifting portions;

c) engaging a lifting tool with at least one of said associated lifting portions; and d) removing by means of a lifting tool the liner element from the mill shell.

2. The method according to claim 1, wherein said one or more fastening bolts are unfastened, and removed, from said one or more associated liner element through-holes of the liner element from outside the mill shell.

3. A method for mounting a liner element to a mill shell of a mill, said liner element having a back side arranged to face the mill shell when mounted, and a front side arranged to face an interior of the mill, the method comprising:

a) fastening one or more liner lifting elements in one or more associated liner element through-holes such that said one or more liner lifting elements protrude out from the back side of the liner element to define associated guide portions and protrude out from the front side of the liner element to define associated lifting portions;

b) engaging a lifting tool with at least one of said associated lifting portions;

c) lifting by means of the lifting tool the liner element into a position with respect to the mill shell at which the one or more liner lifting elements axially coincide with one or more associated mill shell through-holes;

d) displacing by means of the lifting tool the liner element into a mounting position at which the liner element is in abutment with the mill shell by allowing said associated guide portions to penetrate into said one or more associated mill shell through-holes, thereby guiding the liner element into said mounting position;

e) fastening the liner element to the mill shell by at least one fastening bolt; and f) removing said one or more liner lifting elements.

4. The method according to claim 3, wherein said one or more liner lifting elements are removed from outside the mill shell, and the liner element is fastened to the mill shell from outside the mill shell by inserting said at least one fastening bolt into associated mill shell through-holes from outside the mill shell, and threadedly engaging said at least one fastening bolt with the liner element.

* * * * *